United States Patent [19]
Menzies et al.

[11] Patent Number: 6,076,963
[45] Date of Patent: Jun. 20, 2000

[54] AIRCRAFT PROBE WITH INTEGRAL AIR TEMPERATURE SENSOR

[75] Inventors: Margaret A. Menzies, Ruckersville; Guntis U. Baltins, Charlottesville, both of Va.

[73] Assignee: Avionics Specialties, Inc., Earlysville, Va.

[21] Appl. No.: 09/175,466

[22] Filed: Oct. 20, 1998

[51] Int. Cl.[7] .............................. G01K 1/14; G01K 13/02; G01K 17/10; G01C 21/00
[52] U.S. Cl. .......................... 374/138; 374/135; 374/143; 73/180
[58] Field of Search ...................................... 374/138, 143, 374/148, 135; 73/182, 861.65, 861.66

[56] References Cited

U.S. PATENT DOCUMENTS

| | | | |
|---|---|---|---|
| 2,588,840 | 3/1952 | Howland .................................. | 374/138 |
| 4,152,938 | 5/1979 | Danninger ............................... | 374/138 |
| 4,821,566 | 4/1989 | Johnston et al. ........................ | 374/138 |
| 5,544,526 | 8/1996 | Baltins et al. ............................ | 73/180 |
| 5,628,565 | 5/1997 | Hagen et al. ............................ | 374/138 |
| 5,653,538 | 8/1997 | Phillips .................................... | 374/138 |
| 6,012,331 | 1/2000 | Menzies et al. .......................... | 73/180 |

FOREIGN PATENT DOCUMENTS

| | | | |
|---|---|---|---|
| 0475512 | 6/1975 | U.S.S.R. ................................. | 374/138 |
| 1137341 | 1/1985 | U.S.S.R. ................................. | 374/138 |
| 1737284 | 5/1992 | U.S.S.R. ................................. | 374/138 |

*Primary Examiner*—G. Bradley Bennett
*Assistant Examiner*—Gail Verbitsky
*Attorney, Agent, or Firm*—Nixon & Vanderhye P.C.

[57] ABSTRACT

Aircraft probe assemblies integrally include a total airstream temperature sensor. Preferred embodiments include at least one pressure sensing port and a temperature sensing port which are in fluid communication with a pressure sensing chamber and a temperature sensing chamber, respectively. A temperature sensor may thus be disposed in the temperature sensing chamber so as to sense the temperature of the in-flight air flow. The temperature sensor is most preferably shielded thermally from the probe element. Specifically, the temperature sensor is most preferably coaxially surrounded by a generally cylindrical thermal shield structure having airflow inlet and outlet apertures. The thermal shield thereby prevents the temperature of the probe element (which may be heated by an integral electrical resistance heater during potential in-flight icing conditions) from affecting the airflow temperature data obtained by the temperature sensor.

26 Claims, 6 Drawing Sheets

AIRCRAFT PROBE WITH INTEGRAL AIR TEMPERATURE SENSOR

CROSS-REFERENCE TO RELATED PATENT AND APPLICATION

This application is related to U.S. Pat. No. 5,544,526 issued on Aug. 13, 1996 to Guntis U. Baltins et al (hereinafter referenced as the "Baltins et al '526 patent"), and to U.S. patent application Ser. No. 09/109,072 filed on Jul. 2, 1998 in the name of Margaret A. Menzies et al (hereinafter referenced as the "Menzies et al '072 application"). The entire contents of the Baltins et al '526 patent and the Menzies et al '072 application are expressly incorporated hereinto by reference.

FIELD OF THE INVENTION

The present invention relates generally to aircraft flight data sensor probes which derive in-flight information (e.g., angle of attack, side slip, airspeed, altitude and/or vertical speed) from airstream pressure conditions of the aircraft's flight profile. In preferred forms, the present invention is embodied in an aircraft flight data sensor probe that integrally includes a airstream temperature sensor.

BACKGROUND AND SUMMARY OF THE INVENTION

Multifunction aircraft sensor probes are known, such as the multifunction aircraft probe assemblies disclosed in the above-cited Baltins et al '526 patent. In this regard, the probe assemblies of the Baltins et al '526 patent are generally embodied in a rotatable airstream direction probe which is additionally provided with a dynamic pressure sensing port positioned substantially midway between a pair of pneumatic sensing ports which are symmetrically positioned with respect to the probe's stagnation line. A set of pneumatic output ports may thus be provided, each of which communicates with a respective one of the pneumatic sensing ports in the probe.

Thus, when the pneumatic pressures within the paired sensing ports are balanced, the pneumatic pressure at the output port(s) in communication with the sensing ports will be essentially at a pressure $P_1$ which is a monotonic function of static (atmospheric) pressure over a wide range of airspeeds (e.g., from 0.1 Mach to supersonic speeds). The dynamic pressure sensing port, on the other hand, will be presented directly to the airstream when the pressures within the pneumatic sensing ports are balanced. As a result, a dynamic pressure output port which communicates with the dynamic pressure sensing port will exhibit a maximum airstream pressure $P_0$ which is a monotonic function of pitot (ram) pressure over a wide range of airspeeds. These pressures $P_1$ and $P_0$ can thus be converted mathematically into actual pitot (ram) and static (atmospheric) pressures undiluted by any error dependent upon the aircraft's angle of attack and/or side slip. The probe can thus be employed to derive angle of attack and/or side slip flight data information, in addition to primary flight data, such as airspeed, altitude and/or vertical speed.

The airstream temperature represents important information that may be used by on-board instrumentation. For example, actual airstream temperature can be employed to determine the true airspeed of the aircraft during flight (e.g., indicated airspeed compensated by airstream temperature and pressure conditions). Furthermore, airstream temperature is important to initiate activation either manually or automatically of the aircraft's on-board anti-icing equipment.

In-flight airstream temperature data have been determined conventionally using an airstream temperature probe remotely located at a fixed positioned relative to the airstream pressure sensing probe(s). This remote placement of the temperature probe can induce some slight, but meaningful, data errors. In this regard, conventional temperature probes include a resistive thermal device (RTD), a thermally protective shell, and an outer body. The typical RTD, usually made of platinum for temperature stability properties, varies in electrical resistance as a function of sensed temperature. The protective shell serves to protect the RTD from any debris/ice/moisture which may enter the outer body and to protect the RTD from sensing any temperature variation from the heated outer body. The function of the outer body is to duct enough air through the body to allow for dynamic temperature sensing while minimizing the impact of any debris entering from the airflow. To ensure proper airflow, the outer body is heated to prevent ice build-up and reduce moisture content of the air flow through the body.

Conventional aircraft air temperature probes, like pitot probes, are mounted in a fixed position with a large forward-facing opening to minimize error from misalignment with the air flow. However, since both devices measure stagnation (or total) properties of the air flow, measurements of air flows at large incoming angles relative to the forward-facing opening will have an uncorrectable error causing the indicated measurements to be less than stagnation (or total) measurements.

Thus, it would especially be desirable if aircraft temperature probes could be provided which are not susceptible to uncorrectable errors caused by relatively large angles of incoming air flow (which might occur at relatively large angles of attack). It is towards fulfilling such a need that the present invention is directed.

Broadly, the present invention is directed toward an aircraft air temperature probe which is capable of being maintained in substantial alignment with the airstream stagnation line (or line of highest airstream pressure impinging on the probe element's external surface).

In accordance with a particularly preferred embodiment of this invention, the airstream temperature sensor is provided collectively as an integral part of a multifunction aircraft probe assembly of the type disclosed in the Baltins et al '526 patent and/or the Menzies et al '072 application. In this regard, the airstream temperature probe is most preferably isolated physically from the probe assembly's airstream pressure sensing ports, but is capable of being aligned with such sensing ports with the airstream's stagnation line.

In one particularly preferred embodiment, the probe element of this invention is provided with at least one pressure sensing port and a temperature sensing port which are in fluid communication with a pressure sensing chamber and a temperature sensing chamber, respectively, and are each alignable as a unit with respect to the airstream stagnation line. A temperature sensor may thus be disposed in the temperature sensing chamber so as to sense the temperature of the in-flight air flow.

The temperature sensor is most preferably shielded thermally from the probe element. Specifically, the temperature sensor is most preferably coaxially surrounded by a generally cylindrical thermal shield structure having airflow inlet and outlet apertures. The thermal shield thereby prevents the temperature of the probe element (which may be heated by an integral electrical resistance heater during potential in-flight icing conditions) from affecting the airflow temperature data obtained by the temperature sensor.

These and other aspects and advantages of the present invention will become more clear after careful consideration is given to the following detailed description of the preferred exemplary embodiments thereof.

BRIEF DESCRIPTION OF THE ACCOMPANYING DRAWINGS

Reference will hereinafter be made to the accompanying drawings, wherein like reference numerals through the various FIGURES denote like structural elements, and wherein.

DETAILED DESCRIPTION OF THE INVENTION

Figure 1:
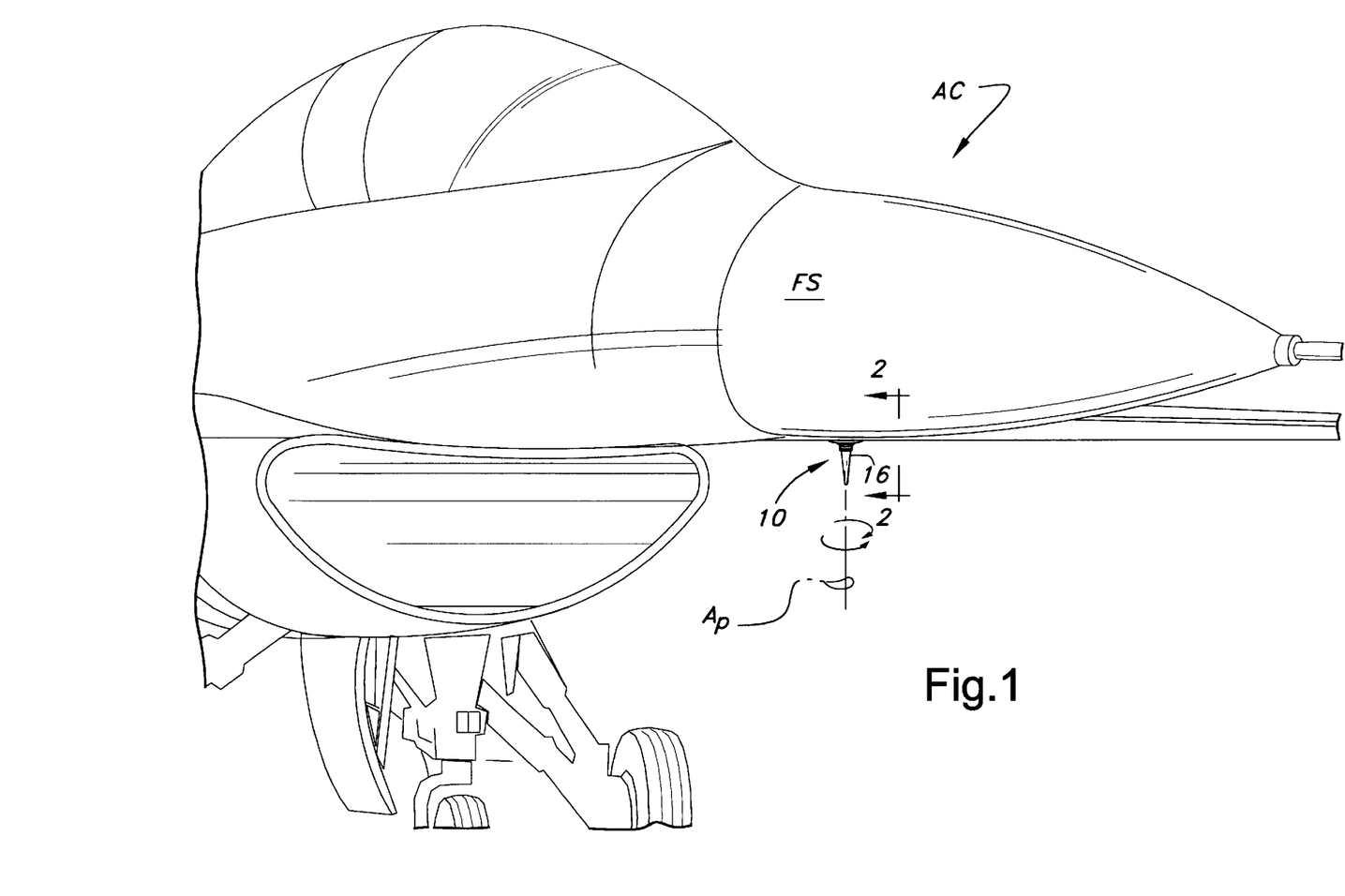
FIG. 1 is a partial perspective view of a forward section of an aircraft showing a preferred sensor assembly in accordance with the present invention.

Accompanying FIG. 1 shows in perspective view a portion of an aircraft AC having an aircraft sensor probe assembly 10 in accordance with the present invention mated to a forward fuselage section FS. The probe assembly projects outwardly from the aircraft fuselage FS along a projection axis $A_p$ so as to be exposed perpendicularly to the in-flight airstream. In this regard, although the aircraft sensor probe assembly 10 is depicted in FIG. 1 as projecting downwardly from the aircraft AC, it will of course be understood that it may project laterally from the aircraft AC if desired. Thus, like the sensor assembly disclosed and claimed in the related Baltins et al '526 patent, the probe assembly 10 of this invention may project from the aircraft at virtually any desired orientation so as to decouple the effects of multiple axis aircraft rotations. Thus, a laterally projecting orientation of the probe assembly 10 may be desired if the angle of attack is intended to be measured with as little influence as possible from the aircraft's angle of sideslip. Alternatively, a downwardly projecting orientation as shown in the accompanying drawing FIGURES may be desired if the aircraft's angle of sideslip is intended to be measured with as little influence as possible from the aircraft's angle of attack.

Figure 2:
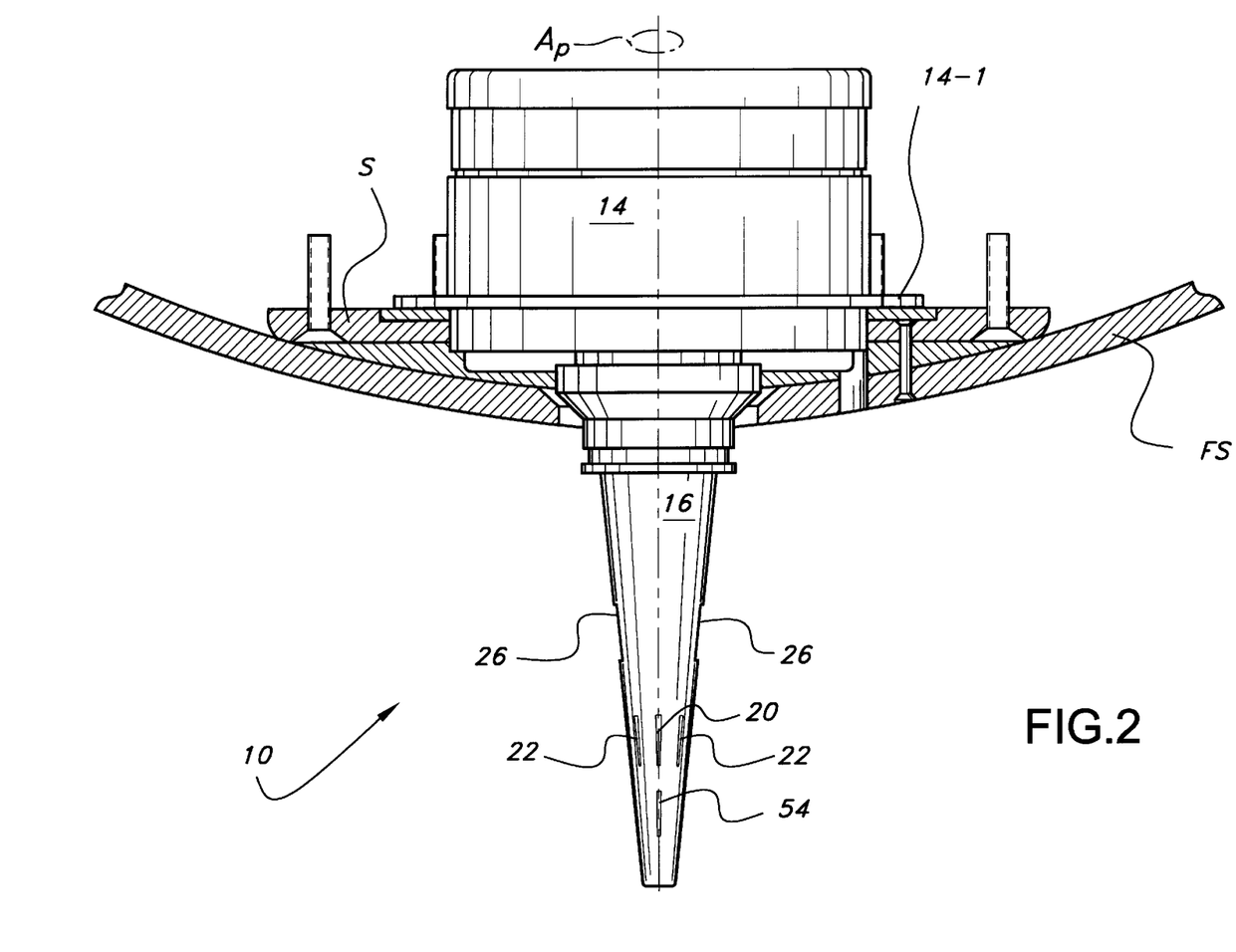
FIG. 2 is a partial cross-sectional view taken through the aircraft fuselage along lines 2—2 in FIG. 1 as viewed from the oncoming airstream flow showing in an enlarged manner a preferred sensor assembly of the present invention.

The airstream direction/pressure data obtained by the probe assembly 10 of this invention may be transferred to the aircraft's on-board flight instrumentation and/or flight director systems via conventional electrical/pneumatic lines connected to the sensor housing 14 (see FIG. 2). In this regard, the internal structures and functions of the housing 14 may be in accordance with the Baltins et al '526 patent, and thus a detailed description thereof may be omitted here.

Figure 3:
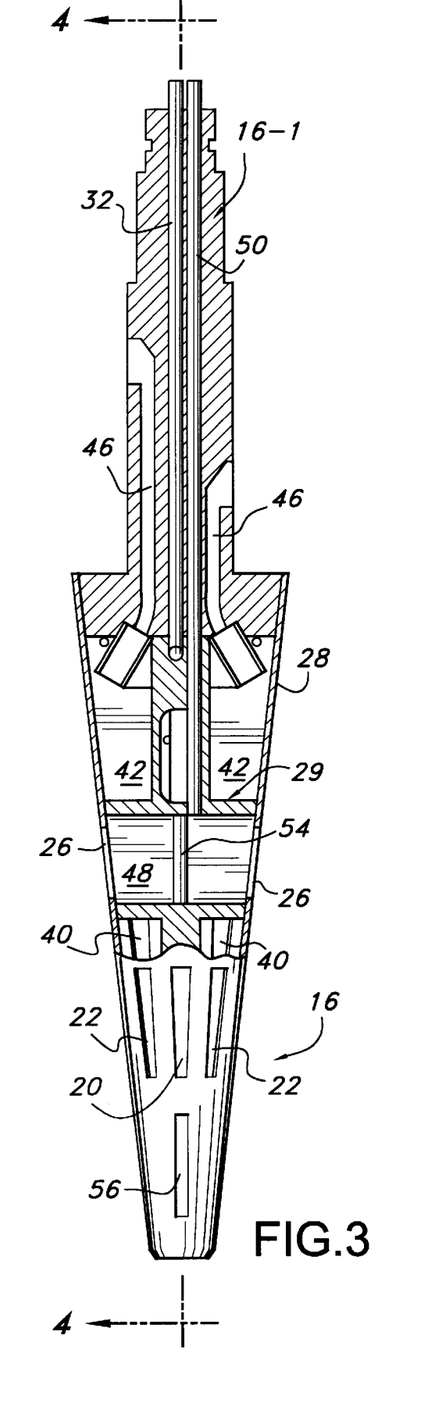
FIG. 3 is an elevational view, partly in section, of the probe element employed in the sensor assembly of this invention.

As seen in accompanying FIGS. 2 and 3, the probe assembly 10 is generally comprised of the housing 14, a generally conical hollow probe element 16, and a mounting collar 14-1. The mounting collar 14-1 is provided so that the probe assembly 10 may be mounted to support structures S associated with the aircraft's fuselage FS such that the housing 14 is within the fuselage FS and the probe element 16 extends outwardly therefrom along projection axis $A_p$.

The conically-shaped hollow probe element 16 is mounted to the housing 14 for pivotal movements around the probe projection axis $A_p$. The probe element 16 is provided with a central dynamic pressure sensing port 20 which is aligned with the probe element's stagnation line (or the line of highest airstream pressure impinging on the probe element's surface) coincident with the probe element's projection axis $A_p$. The sensing port 20 is most preferably in the form of an elongate slot, the axis of elongation being disposed generally in the direction of the projection axis $A_p$.

The probe element 16 is most preferably provided with a number of other pressure ports in the manner described in the above-cited Menzies et al '072 application. For example, a pair of pneumatic sensing ports 22 is preferably provided in the probe element 16 with each being symmetrically circumferentially spaced from the central dynamic pressure port 20. In this regard, each of the sensing ports 22 is most preferably symmetrically circumferentially spaced from the port 20 by substantially 45° (i.e., so that the pair of pressure ports 22 is circumferentially spaced from each other by substantially 90°). Each of the ports 22 is most preferably in the form of elongate slots whose longitudinal extent is disposed generally in the direction of the projection axis $A_p$. Although a single pair of ports 22 is depicted in FIG. 2, the probe element 16 may be provided with proximal and distal pairs of ports (e.g., in the manner described in the above-cited Menzies et al '072 application), in which case respective ones of the proximal and distal ports are most preferably longitudinally aligned with one another.

A pair of outer pneumatic pressure ports 26 is also preferably provided in the probe element 16. Most preferably, each of the outer pressure ports 26 is symmetrically circumferentially spaced from the central pressure port 20 by about 90° (i.e., so that the pressure ports 26 are substantially latitudinally opposed to one another in the outer surface of the probe element 16). As shown in FIG. 2, the outer pair of pressure ports 26 are proximally positioned in the outer surface of the probe element 16 relative to the more distally located pair of ports 22. Like the ports 20 and 22 discussed previously, the ports 26 are most preferably in the form of elongate slots whose longitudinal extent is disposed generally in the direction of the projection axis $A_p$. In this regard, each of the ports 20 and 22 is most preferably tapered toward the apical end of the conical probe element 16. That is, the ports 20 and 22 are tapered to an extent so as to have a substantially constant included angle—that is, so as to taper to the same extent as the probe element 16.

Figure 4:
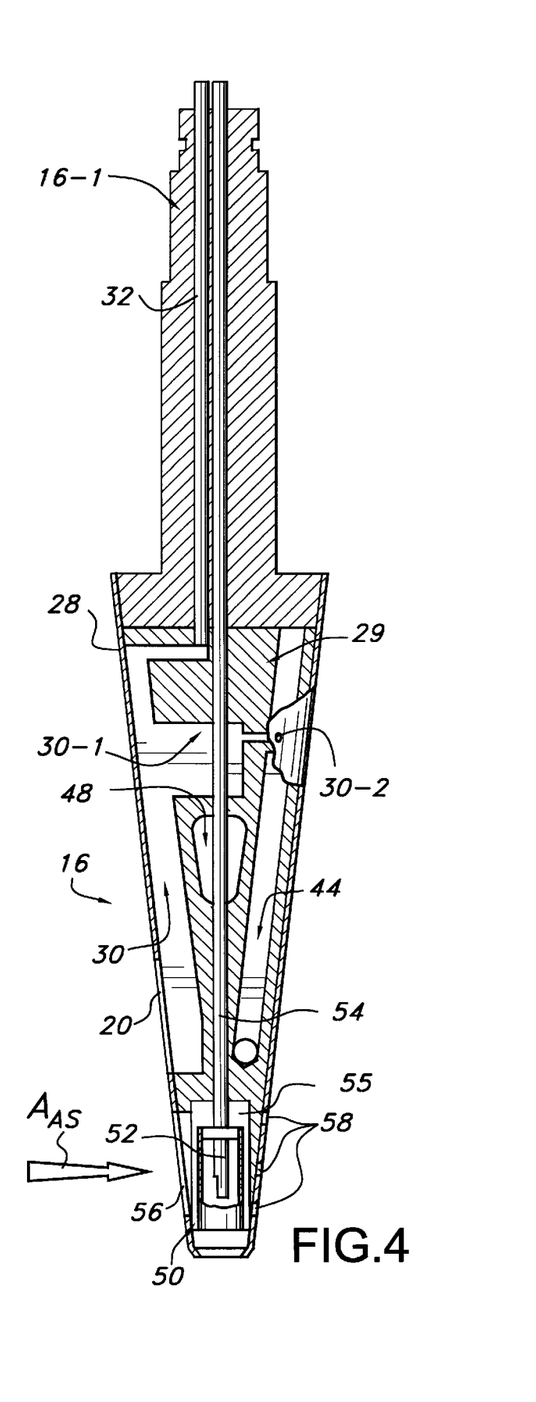
FIG. 4 is a cross-sectional elevational view of the probe element shown in FIG. 3 as taken along line 4—4 therein.
Figure 5:
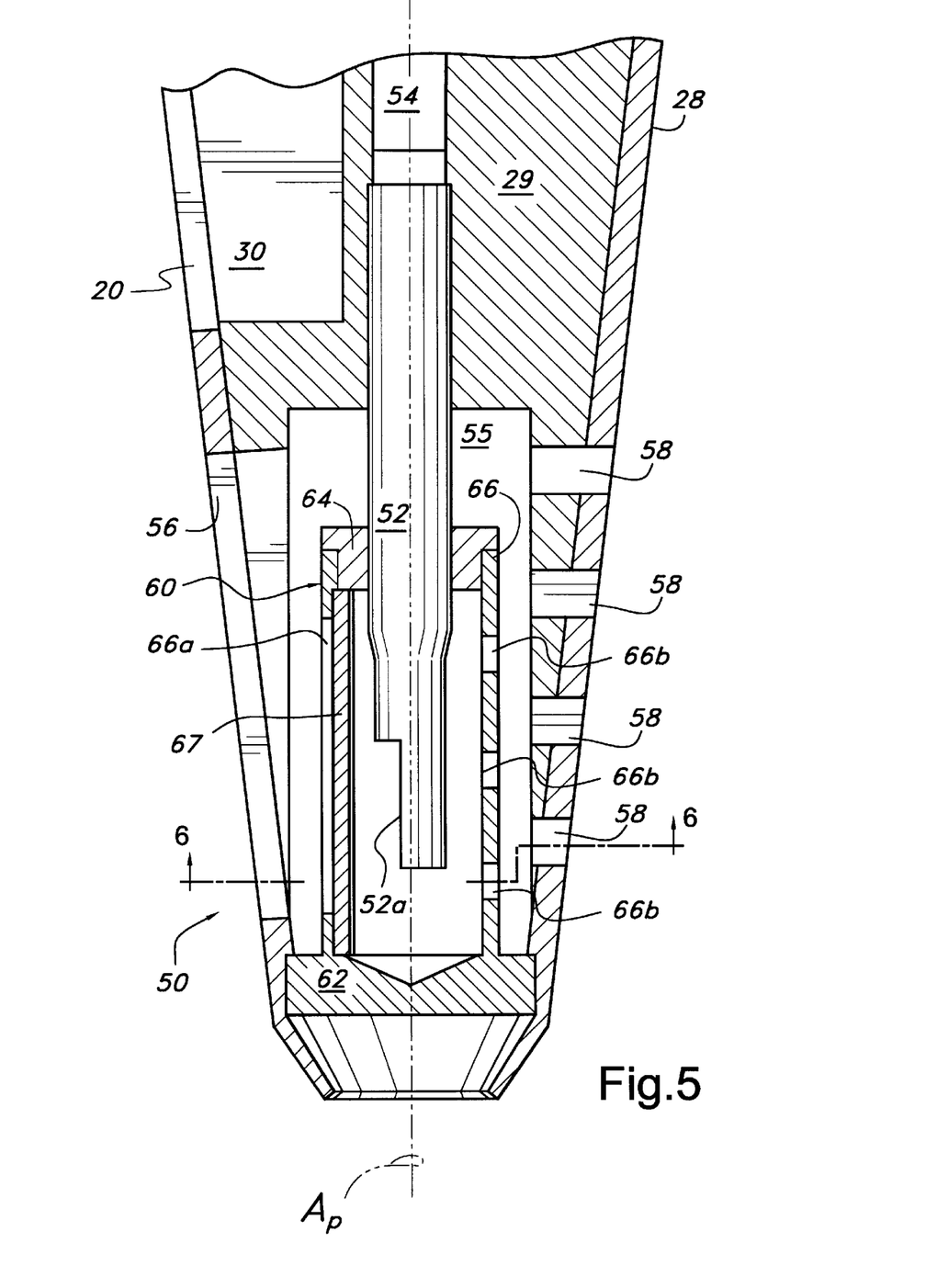
FIG. 5 is an enlarged elevational view of the distal tip region of the probe element shown in FIGS. 3 and 4.
Figure 6:
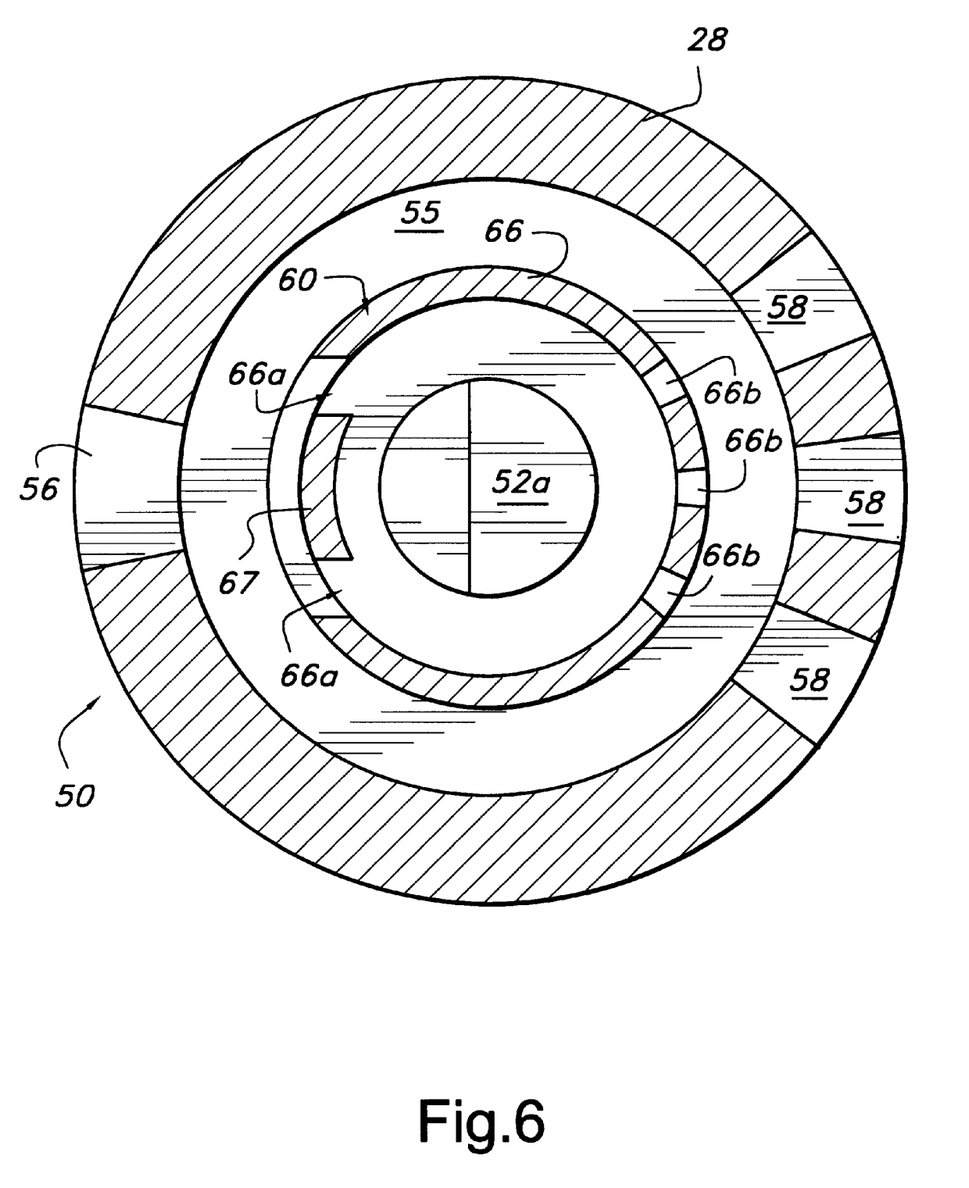
FIG. 6 is a cross-sectional view of the distal tip region of the probe element shown in FIG. 5 as taken along line 6—6 therein.

As is perhaps more clearly depicted in accompanying FIG. 3 and 4, the probe element 16 includes a generally conically shaped outer probe shell 28 and an internal separator vane 29. The separator vane 29 is most preferably in the form of a one-piece triangularly shaped structure which is sized and dimensioned between is converging leading and trailing edged (relative to the flow direction of the airstream as noted by arrow $A_{AS}$ shown in FIG. 4) so as to fit closely within the conical interior of the probe shell 28. The separator vane 29 is therefore positioned entirely within the hollow of the conical probe element shell 28 and is fixed thereto in such a manner that it rotates as a unit with the probe element 16 around the projection axis $A_p$.

The separator vane 28 is provided with a leading edge chamber 30 (see FIG. 4) which fluid-communicates with the port 20 at a distal end thereof. The other (proximal) end of the chamber 30 is in fluid-communication with a tubular conduit 32 extending the lengthwise dimension of probe stem 16-1. A drain sump 30-1 is also provided so as to allow moisture to drain from the chamber 30 through drain hole 30-2 on the exterior surface of the probe element 16. In this regard, the conduit 32 is fluid-connected to suitable pressure sensors (not shown) within the housing 14 so as to convert the pressure condition sensed thereby into suitable data signals.

Ports 22 communicate with lateral forward chambers 40 which, in turn, communicates with rearward chambers 42 in a manner similar to that disclosed in the above-cited Menzies et al '072 application. That is, the chambers 40 and 42 are collectively established by the interior surface of the generally conically shaped probe shell 28 and the separator vane 29 housed therewithin and, as such, fluid communicate with one another around the transverse chamber 48. The rearward chambers 42 are therefore capable of being connected pneumatically to suitable sensors (not shown) within housing 14 via passageways 46.

An electrical resistance probe heater 44 is embedded within the separator vane 29 so as to heat the probe element 16 to a sufficiently elevated temperature to minimize substantially (or prevent entirely) the formation and/or accumulation of ice that may accrete during in-flight icing conditions.

Each of the laterally opposed ports 26 communicates with a transversely extending chamber 48. The chamber 48 is in turn fluid-connected to pneumatic sensors (not shown) within housing 14 by conduit 49 extending the lengthwise dimension of probe stem 16-1.

Important to the present invention, the probe element 16 includes near its apical end, an air temperature probe assembly 50 which is essentially provided with an air temperature probe 52 whose electrical leadwire(s) (not shown) may be routed through chase conduit 54 and connected operatively to suitable sensors (not shown) housed within housing 14. The air temperature probe 52 is, in and of itself, conventional and is most preferably a resistive thermal device (RTD) suitable for aircraft installations. One particularly preferred RTD that may be employed in the present invention is a Model F3107 available commercially from Omega Engineering, Inc.

The probe element 52 extends forwardly toward the apical end of the probe element 16 so that a terminal longitudinal sensing tip portion 52a thereof is positioned within a generally cylindrical cavity 55 formed at the distal end of the separator vane 29. The cavity 55 is in fluid communication with the oncoming airflow by virtue of port 56. In this regard, port 56, like port 20 discussed above, is most preferably in the form of an elongate slot oriented generally longitudinally along the lengthwise axis of the probe element 16 and which, in use, is coincident to the airflow stagnation line. That is, since the probe element 16 will rotate about the probe axis $A_p$ due to the pressure-equalization discussed previously, the port 56 will aligned coincidentally with the stagnation flow line of the oncoming airstream. The outflow air from the cavity 55 passes through a series of longitudinally spaced-apart vent apertures 58 disposed on the low pressure (trailing) side of the probe element 16.

The sensing tip 52a of the temperature probe 52 is itself housed within a generally cylindrical thermal shield 60, having forward and rearward closed ends 62, 64, respectively, and a substantially cylindrical side wall 66 rigidly extending therebetween. Most preferably, the side wall 66 of the shield 60 is formed from a stainless steel (e.g., inconel) material due to its advantageous thermal transfer properties. The shield 60 essentially thermally isolates the sensing tip 52a of the temperature probe element 52 from the separator vane 29 and shell 28 structures so as to prevent an increase in air temperature in the vicinity of the sensing tip 52a by temperature radiation therefrom (e.g., which may occur during operation of the probe heater 44). As a result, inaccurate air temperature data is prevented when the probe element 16 is heated internally (e.g., during in-flight icing conditions) by probe heater 44.

The forward end 62 of the shield 60 is rigidly connected to the apical end of the probe shell 28 by any suitable means. The cylindrical wall 66 thus extends rearwardly therefrom and coaxially surrounds the sensing tip 52a of the temperature probe 52. The wall 66 is provided with longitudinally oriented inflow ports 66a, and a series of longitudinally spaced-apart outflow ports 66b. Most preferably, a pair of inflow ports 66a and three outflow ports 66b are provided, but lesser/greater numbers of such ports may be provided without departing from the present invention. The ports 66a, 66b are most preferably oriented symmetrically relative to the longitudinal midplane of the probe element 16 which remains coincident with the airstream stagnation line.

The inflow ports 66a are defined between respective lateral edges of a longitudinally extending central impact bridge 67 and the side wall 66 of the shield 60. The impact bridge is rigidly connected to the shield 60 so as to extend the entire longitudinal extent of the ports 66a. The impact bridge section 67 serves as an impact structure against which debris entrained in the air flow and entering through slot 56 may strike. IN such a manner, therefore, the bridge section 67 prevents the debris from striking the temperature sensor 52 within the shield 60 thereby avoiding probe damage. Also, the impact bridge section 67 serves as an air flow stagnator. The impact bridge section 67 is radially inwardly set relative to the side wall 66 of the shield 60 and the inflow ports 66a thereof.

In use, the airflow will enter the cavity 55 via port 56 and will ultimately enter the shield 60 via ports 66a where it contacts the sensing tip 52a of the temperature sensing probe 52. The RTD sensing probe 52 will thereby communicate the temperature of the airflow to onboard computers (not shown). Outflow air will be discharged through the ports 66b and apertures 58. The air flow in the annular space of the cavity 55 which surrounds the shield 60 serves to wick away heat therefrom (e.g., due to heat transfer from the shield 60 to the air flow within the surrounding annular space) so that the air within the shield 60 is not affected by the probe heater 44. Also, more accurate in-flight temperature data may be obtained in accordance with the present invention since the sensing tip 52a of the temperature probe 52 is exposed at all times to the airflow stagnation line along the probe element 16 in the manner discussed previously.

The specific sizes and/or orientations of the slots 56, 58, 66a and 66b are designed to balance several criteria. For example, the air flow permitted by such slots must be sufficient to allow enough heat to be provided to the probe element 16 generally to keep it deiced, but insufficient to heat the air around the sensing tip 52a of probe 52. Sufficient air flow from the outer body of the probe element 16 to the temperature probe 52 must be provided for dynamic temperature measurement without having too much air flow which would invalidate the air flow's stagnation properties. The air flow must also be sufficient so that the effective thermal boundary layer thickness around the shield 60 is less than the space between the interior surface of the cavity 55 and the shield 60. The outlet ports 58 and 66b must be sized and positioned to ensure positive flow through the distal tip of the probe 16 despite external flow conditions throughout a wide variety of potential flight profiles and air speeds. Finally, the size of the various ports should be minimized to prevent particles of any reasonable but undetermined mass and density that enter into the probe 16 from impacting the temperature probe 52.

Figure 7:
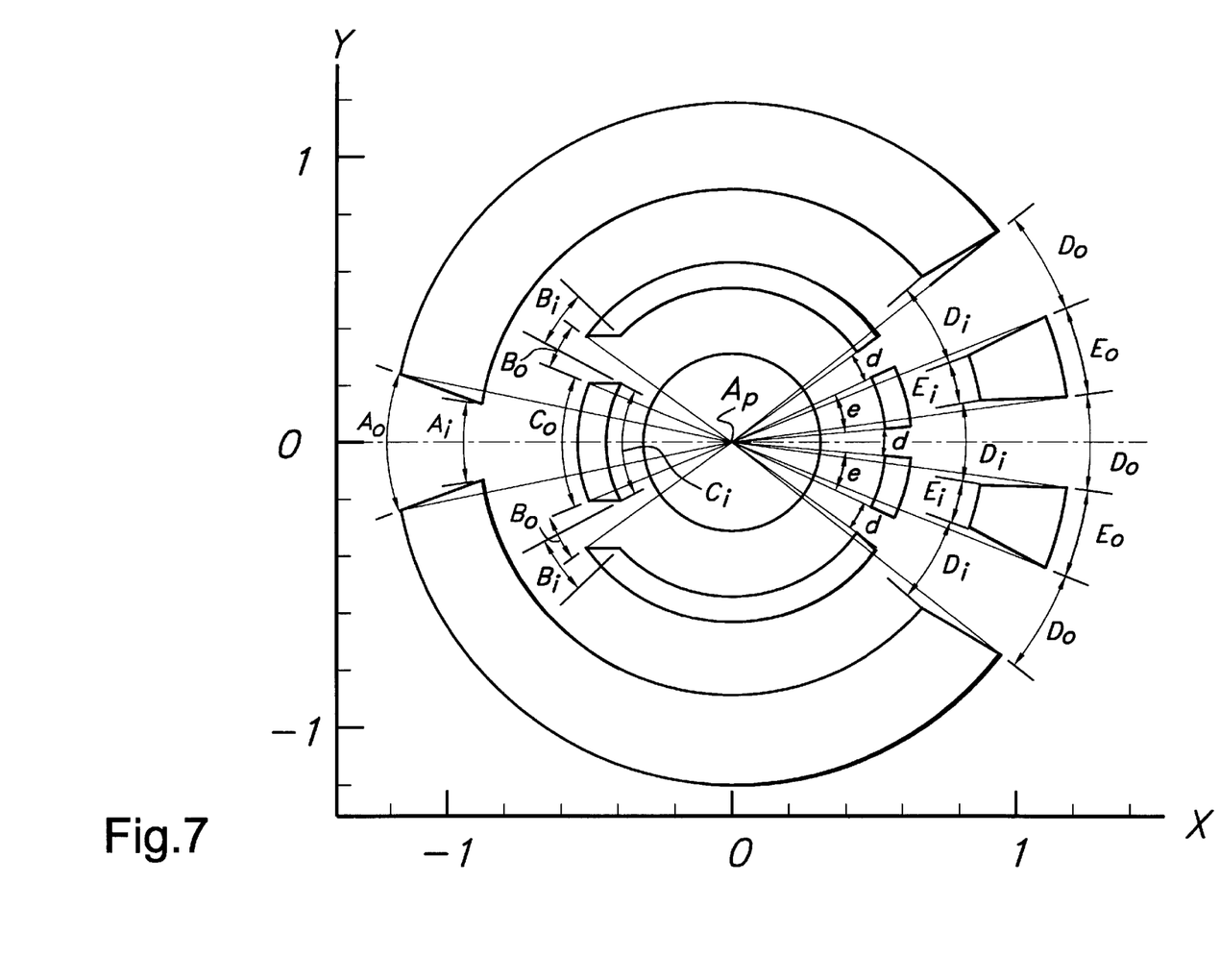
FIG. 7 is a schematic cross-sectional view similar to FIG. 6 showing some preferred angles and orientation of the various slots employed for the temperature sensor region in accordance with this invention.

Accompanying FIG. 7 shows in schematic fashion one particularly preferred embodiment which satisfies the criteria described above. In this regard, the ports 56, 58, 66a and 66b will most preferably have the following angular relationships as measured transversely from the probe axis $A_p$: angle $A_o$ (outer edge of port 56)=23.0°; angle $A_i$ (inner edge of port 56)=20.0°; angle $B_o$ (entire outer gap angle of the ports 66a as determined circumferentially from the outermost edges thereof=70.0°; angle $B_i$ (entire gap angle of the ports 66a as determined circumferentially from the innermost edges thereof)=88.3°; angle $C_o$ (the angle between circumferentially opposed outer edges of the impact section 67)=44.0°; angle $C_i$ (the angle between circumferentially opposed outer edges of the impact section 67)=54.0°; angle between angles $B_o$ and $C_o$=13°; angle $D_o$ (angle between the outer opposed edges of slots 58)=15°; angle $D_i$ (angle between the inner opposed edges of slots 58)=20.°; angle d (angle between the inner and outer edges of slots 66b)=10.0°; angle $E_o$ (angle between outer opposed edges of solid piece between adjacent slots 58)=15°; angle $E_i$ (angle between inner opposed edges of solid piece between adjacent slots 58)=10.0°; angle e (angles between outer and inner edges of the solid piece of shield 60 between adjacent ones of slots 66b)=20.0° and 18.3°, respectively.

The angles for the other ones of ports 58, 66b and solid pieces therebetween are identical to those described above since the probe 16 is symmetrical about the y axis. The radius, however, varies due to the preferred conical shape of the probe 16. When utilizing the size parameters noted above, the flow characteristics of the air temperature probe assembly 50 have been calculated to provide acceptable performance given the criteria noted previously.

Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An aircraft sensor probe assembly comprising:
an elongated probe element adapted to project outwardly from an aircraft along a projection axis and into an in-flight airflow stream, said probe element being mounted for rotational movement about said projection axis;
a temperature sensing chamber formed in said probe element said temperature sensing chamber having inlet and outlet airflow ports to allow a portion of the airflow stream to flow thereinto and therefrom, respectively; and
a temperature sensor disposed in said temperature sensing chamber to sense the temperature of said airflow stream portion flowing into said temperature sensing chamber, wherein said inlet airflow port is aligned longitudinally with respect to said projection axis such that rotation of said probe element causes said inlet airflow port to be coincident with a stagnation line of an oncoming airstream.

2. The aircraft sensor probe assembly as in claim 1, further comprising a thermal shield to thermally isolate said temperature sensor from said probe element.

3. The aircraft sensor probe assembly as in claim 2, wherein said thermal shield is generally cylindrical and coaxially surrounds said temperature sensor.

4. The aircraft sensor probe assembly as in claim 3, wherein said thermal shield includes forward and distal ends, and a generally cylindrical side wall rigidly connected therebetween.

5. The aircraft sensor probe assembly as in claim 4, wherein said side wall includes inflow and outflow apertures.

6. The aircraft sensor probe assembly as in any one of claims 1–5, wherein said temperature sensing chamber is located at a distal end of said elongate probe element.

7. The aircraft sensor probe assembly as in claim 6, wherein said probe element is generally conically shaped.

8. The aircraft sensor probe assembly as in claim 1, wherein said probe element has at least one pressure port formed in said probe element to sense a pressure condition of the airflow stream.

9. The aircraft sensor probe assembly as in claim 8, wherein said probe element includes a plurality of said pressure ports.

10. The aircraft sensor probe assembly as in claim 9, wherein said pressure ports are generally longitudinally oriented slots.

11. The aircraft probe assembly as in claim 10, wherein said probe element is conically shaped and establishes a distal apical end, and wherein said slots are tapered toward said apical end of said probe element.

12. The aircraft probe assembly as in claim 8, wherein said at least one pressure port and said inlet airflow aperture are oriented longitudinally along an airflow stagnation line on an exterior surface of said probe element.

13. The aircraft sensor probe assembly as in claim 12, wherein said probe element includes a pair of circumferentially spaced-apart pneumatic sensing ports, and a dynamic pressure port disposed along said stagnation line substantially midway between said pair of pneumatic sensing ports.

14. The aircraft sensor probe assembly as in claim 13, wherein said probe element includes a pair of outer pressure ports which are substantially diametrically opposed to one another.

15. An aircraft probe assembly comprising:
a hollow, generally conically shaped probe element having a pressure port and a temperature sensing port defined therein;
a separator nested within said probe element and establishing a pressure chamber in fluid communication with said pressure port, and a temperature sensing chamber in fluid communication with said temperature sensing port, wherein said pressure chamber and said temperature sensing chamber are fluid-isolated from one another; and
a temperature sensor disposed in said temperature sensing chamber.

16. The aircraft probe assembly as in claim 15, wherein said pressure port and said temperature sensing port are elongate slots.

17. The aircraft probe assembly as in claim 16, wherein said pressure port and said temperature sensing port are longitudinally aligned with one another.

18. The aircraft probe assembly as in claim 15, 16 or 17, wherein said pressure port and said temperature sensing port are each aligned with a stagnation line on an exterior surface of said probe element.

19. The aircraft probe assembly as in claim 15, wherein said temperature sensing chamber is located at an apical end of said elongate probe element.

20. The aircraft sensor probe assembly as in claim 1 or 19, further comprising a thermal shield.

21. The aircraft sensor probe assembly as in claim 20, wherein said shield is generally cylindrical and coaxially surrounds said temperature sensor.

22. The aircraft sensor probe assembly as in claim 21, wherein said shield includes forward and distal ends, and a generally cylindrical side wall rigidly connected therebetween.

23. The aircraft sensor probe assembly as in claim 20, wherein said shield includes inflow and outflow ports.

24. The aircraft sensor probe assembly as in claim 23, wherein said shield includes an impact bridge element which establishes a pair of said inflow ports.

25. The aircraft sensor probe assembly as in claim 24, wherein said shield includes a generally cylindrical side wall, and wherein said impact bridge element is radially inwardly set relative to said side wall.

26. The aircraft sensor probe assembly as in claim 16, which includes at least one pair of pneumatic sensing ports circumferentially spaced apart from one another, and wherein said separator establishes at least one pneumatic sensing chamber in fluid communication with said at least one pair of pneumatic sensing ports.

* * * * *